(12) United States Patent
Ueda

(10) Patent No.: US 6,498,878 B1
(45) Date of Patent: Dec. 24, 2002

(54) ARRAYED WAVEGUIDE GRATING

(75) Inventor: Tetsuji Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/656,753

(22) Filed: Sep. 7, 2000

(30) Foreign Application Priority Data

Sep. 10, 1999 (JP) ............................................. 11-258032

(51) Int. Cl.[7] ................................................. G02B 6/26
(52) U.S. Cl. ............................ 385/37; 385/24; 385/46
(58) Field of Search ............................. 385/24, 37, 14, 385/16, 46, 43; 359/127, 124, 130, 115; 370/3

(56) References Cited

U.S. PATENT DOCUMENTS

| | | | | |
|---|---|---|---|---|
| 4,970,713 A | * | 11/1990 | Imoto ............................. | 370/3 |
| 5,745,612 A | * | 4/1998 | Wang et al. ................... | 385/24 |
| 5,838,844 A | * | 11/1998 | Van Dam et al. .............. | 385/14 |
| 5,862,279 A | * | 1/1999 | Amersfoort et al. .......... | 385/40 |
| 6,229,938 B1 | * | 5/2001 | Hibino et al. .................. | 385/24 |
| 6,236,774 B1 | * | 5/2001 | Lackritz et al. ................ | 385/14 |

FOREIGN PATENT DOCUMENTS

| JP | 5-323246 | * 12/1993 | .................. 359/115 |
|---|---|---|---|
| JP | 7-333446 | 12/1995 | |

OTHER PUBLICATIONS

Japanese Office Action dated Jul. 16, 2002, with partial English translation.

* cited by examiner

Primary Examiner—Frank G. Font
Assistant Examiner—Michael P. Mooney
(74) Attorney, Agent, or Firm—McGinn & Gibb, PLLC

(57) ABSTRACT

An arrayed waveguide grating for multiplexing or demultiplexing WDM optical signals is fabricated by forming an input waveguide, an input slab waveguide, arrayed waveguides, an output slab waveguide and output waveguides on a circuit substrate, and integrated with a thin film heater. Since the arrayed waveguide grating does not necessitate an independent component for controlling temperature, such as a thin heater or Peltier, and the structure thereof is simplified and unified.

15 Claims, 2 Drawing Sheets

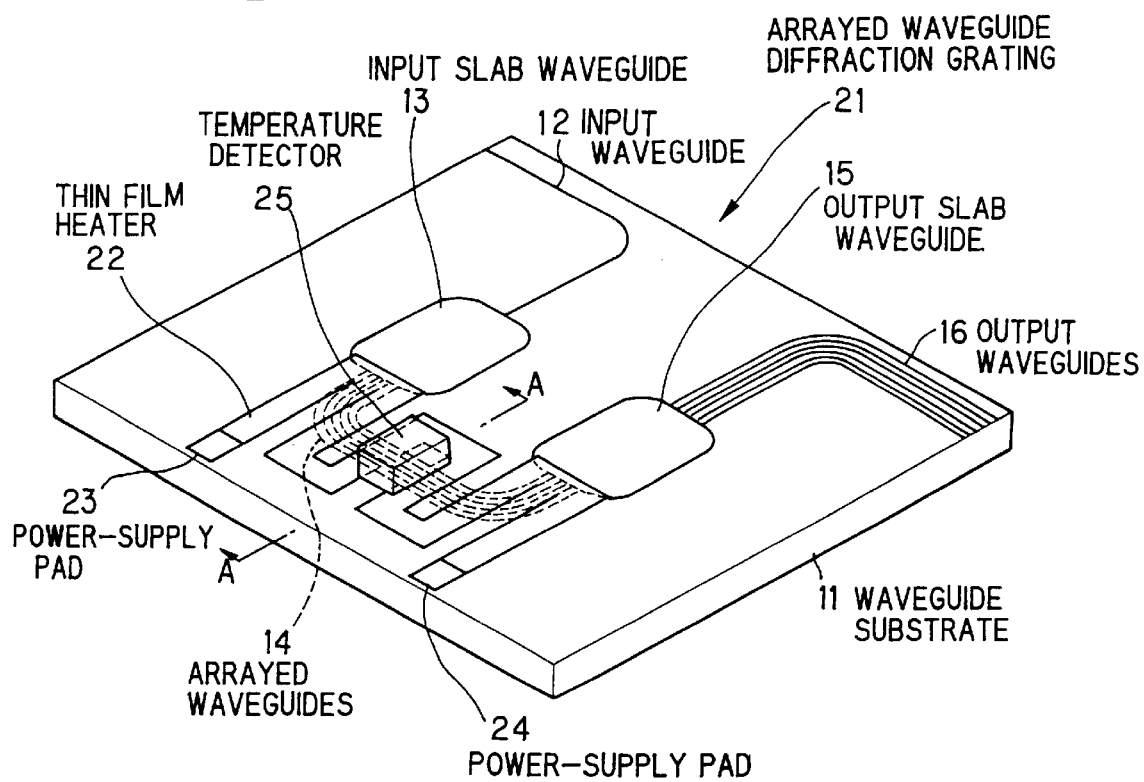
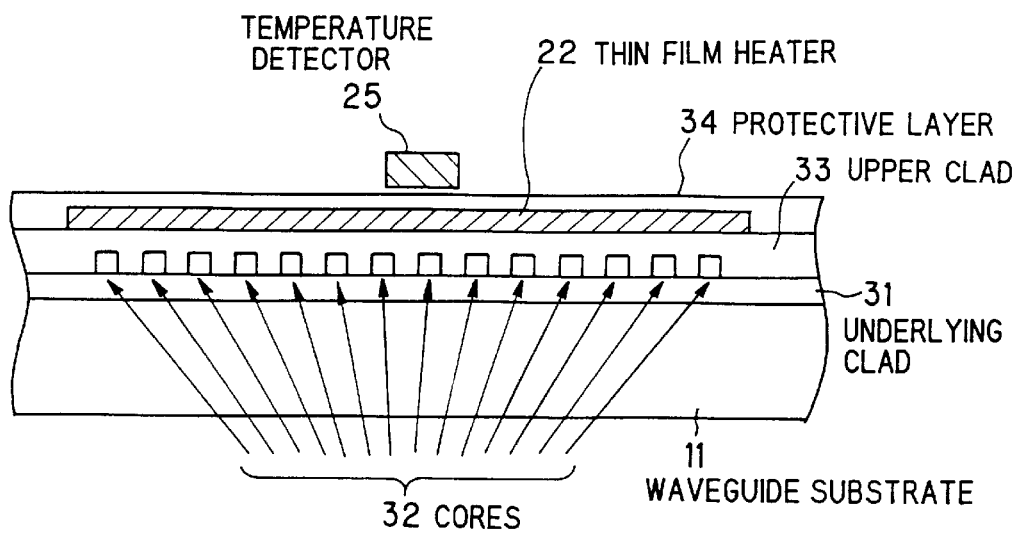

ARRAYED WAVEGUIDE GRATING

FIELD OF THE INVENTION

The invention relates to an arrayed waveguide grating, which is widely used as a key device for constructing a wavelength division multiplexed (WDM, hereinafter ) optical communication system, and multiplexes or demultiplexes WDM optical signals in accordance with wavelengths of individual optical signals.

BACKGROUND OF THE INVENTION

Hitherto, an arrayed waveguide grating for multiplexing or demultiplexing WDM optical signals is well known to all as a key device for constructing the WDM optical transmission system, such as an optical wave address network or an optical switching system.

FIG. 1 is a perspective view for showing a method for controlling temperature of a conventional arrayed waveguide grating, and a reference numeral 1 shows the arrayed waveguide grating, 2 shows a metallic plate, 3 shows a temperature-control unit, 4 shows a heat sink, 5, 6 show optical fiber arrays, 7 shows an optical fiber, and 8 shows a taped optical fiber.

In the arrayed waveguide grating 1, an input waveguide 12, an input slab waveguide 13, arrayed waveguides 14 composed of plural waveguides successively extending in a length by ΔL, an output slab waveguide 15 and N output waveguides 16 are formed on a waveguide substrate 11. The arrayed waveguide grating 1 has the function of demultiplexing the WDM optical signals, which are composed of N optical signals having the wavelength of $\lambda_1, \lambda_2, \ldots, \lambda_n$ and supplied through the input waveguide 12, into the N individual optical signals and outputting them through the output waveguides 16 respectively corresponding to their wavelengths.

The temperature-control unit 3 is formed of Peltier or a thin heater.

An outline of the principle of the operation of the arrayed waveguide grating 1 will be explained for a case that this circuit is used as a demultiplexer as an example.

The WDM optical signals incident on the input waveguide 12 are diffracted by the input slab waveguide 13, divided among the arrayed waveguides 14, and propagate therethrough. Although each optical signal is in the same phase in the input end of the arrayed waveguides 14, since the arrayed waveguides 14 successively extend in a length by ΔL, each optical signal undergoes a difference in a phase between the adjacent waveguides at the output end of the arrayed waveguides 14 depending on the wavelength thereof. When each optical signal is supplied to the output slab waveguide 15 from the arrayed waveguides 14 and propagates therethrough, each optical signal is focused on one of the output waveguides 16 at the output end of the output slab waveguide 15 depending on the wavelength thereof. The WDM optical signals are demultiplexed into the N individual optical signals in this way, and outputted through the output waveguides 16.

In the arrayed waveguide grating 1, an insertion loss of the optical signal supplied to one of the output waveguides 16 becomes the minimum at a certain center wavelength. In order to make the certain center wavelength coincide with a desired wavelength, it is necessary to control the phase difference of the optical signal between the adjacent waveguides at the output end of the arrayed waveguides 14 so as to coincide with a predetermined-value.

A main ingredient of the core of the waveguide through which the optical signal propagates is $SiO_2$ in most cases, and a refractive index of $SiO_2$ changes in accordance with temperature. Accordingly, it is necessary to control temperature of the arrayed waveguides 14 so as to maintain a predetermined value.

In the conventional arrayed waveguide grating 1, the temperature-control unit 3 for maintaining temperature of the arrayed waveguides 14 at a predetermined value is brought into contact with a reverse surface of the waveguide substrate 11 via the metallic plate 2 in order to make the center wavelength coincide with the desired wavelength.

A thin heater or Peltier is selected as the temperature-control unit 3 in accordance with operating temperature of the arrayed waveguides 14. Generally speaking, in case that an optical circuit is so designed that the center wavelength coincides with the desired wavelength at about 80° C., which is higher than ordinary ambient temperature, the thin heater is adopted. In case that the optical circuit is so designed that the center wavelength coincides with the desired wavelength at a medium value of ordinary ambient temperature, Peltier is adopted.

In the aforementioned conventional arrayed waveguide grating 1, since the temperature-control unit 3 for maintaining temperature thereof at a predetermined value is brought into contact with the reverse surface of the circuit substrate 11 via the metallic plate 2 and thereby temperature of the arrayed waveguides 14 is kept to be a predetermined value, the temperature-control unit 3 formed into an independent component is indispensable. As a result, since it becomes necessary to join plural parts together to fabricate the arrayed waveguide grating 1 (a module, hereinafter at need), the module cannot be thinned, and is not resistant to vibration or shock. Accordingly, fabrication process becomes complicated, and cost of production increases.

SUMMARY OF THE INVENTION

Accordingly, it is an object of the invention to provide an arrayed waveguide grating which does not necessitate a thin heater or Peltier to be combined with a module as an independent component, and has a thin, simplified and unified structure.

According to the feature of the invention, an arrayed waveguide grating comprises:

at least one input waveguide formed on a substrate,
an input slab waveguide formed on the substrate,
arrayed waveguides formed on the substrate,
an output slab waveguide formed on the substrate,
plural output waveguides formed on the substrate, and,
temperature-control means integrated with the arrayed waveguide grating In the arrayed waveguide grating according to claim 2, the temperature-control means is formed on the arrayed waveguides.

In the arrayed waveguide grating according to claim 3, the temperature-control means is a thin film heater.

In the arrayed waveguide grating according to claim 4, the thin film heater is formed by means of evaporation.

In the arrayed waveguide grating according to claim 5, the thin film heater is formed of metal.

In the arrayed waveguide grating according to claim 6, the thin film heater is covered with a protective layer.

BRIEF DESCRIPTION OF THE DRAWINGS

The invention will be explained in more detail in conjunction with appended drawings, wherein:

FIG. 2 is a perspective view for showing an arrayed waveguide grating according to the invention, and FIG. 3 is a cross-sectional view of an arrayed waveguide grating shown in FIG. 2 taken along a line A—A.

DESCRIPTION OF THE PREFERRED EMBODIMENTS

Figure 1:
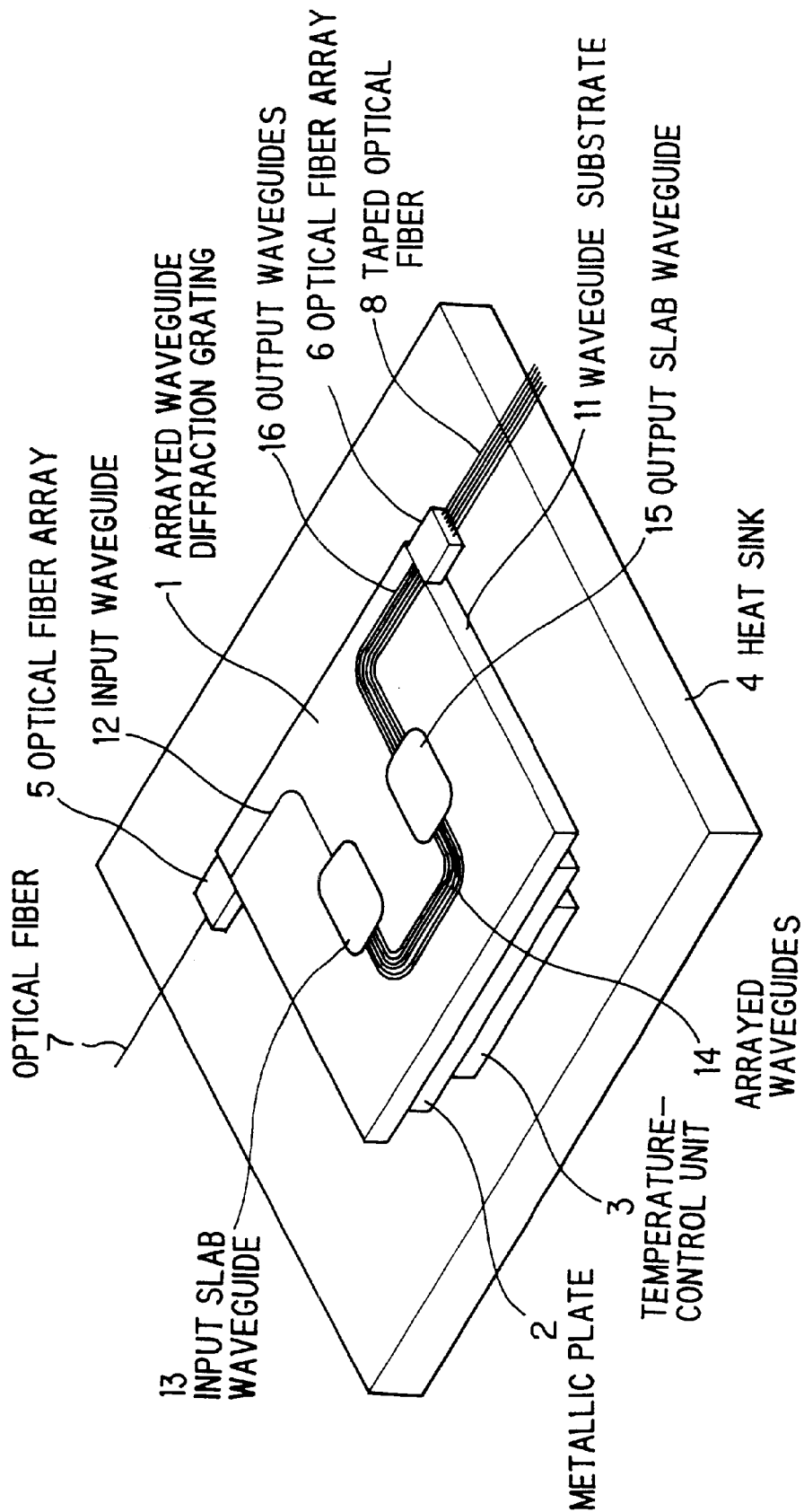
FIG. 1 shows a method for controlling temperature of a conventional arrayed waveguide grating.

An arrayed waveguide grating according to a preferred embodiment of the invention will be explained referring to the appended drawings.

FIG. 2 is a perspective view for showing the arrayed waveguide grating according to a preferred embodiment of the invention, and FIG. 3 shows a cross-sectional view of the structure shown in FIG. 2 taken along a line A—A. In FIGS. 2 and 3, a reference numeral 21 shows an arrayed waveguide grating according to the invention, 22 shows a thin film heater formed of metal, which covers an arrayed waveguides 14 as an upper layer thereof, 23, 24 show power-supply pads extending on a side surface of the arrayed waveguides 14, and 25 shows a temperature-detector.

As shown in FIGS. 2 and 3, the structure of the arrayed waveguide grating 21 in the neighborhood of the thin film heater 22 is as follows. An underlying clad 31, cores 32 of the arrayed waveguides 14, and an upper clad 33 are successively deposited on the waveguide substrate 11, and the metallic thin film heater 22 is formed in a zigzag direction on the upper clad 33 covering the cores 32. Moreover, a protective layer 34 is formed on the thin film heater 22 so as to cover the same, and the temperature-detector 25 is situated on the protective layer 34.

The power-supply pads 23, 24 are connected with the thin film heater 22. The protective layer 34 is not formed on the power-supply pads 23, 24 and upper surfaces of these pads are bare. The power-supply pads 23, 24 are connected with a power-supply (not shown) by means of wire-bonding, and the thin film heater 22 is supplied with an electric current.

The waveguide substrate 11 is formed of inorganic material, such as Si or $SiO_2$, or heat-resisting organic material, such as polyimide. The underlying clad 31 and the upper clad 33 are formed of $SiO_2$ glass, or organic resin, such as polyimide. The core 32 is formed of Ge-doped $SiO_2$ glass with a high refractive index, or organic resin with high transmissivity for infrared rays.

The thin film heater 22 is formed of metal, such as Au, Pt, Cr, etc. The protective layer 34 is formed of glass or organic resin, such as polyimide.

In case that the arrayed waveguides 14 are formed of $SiO_2$ waveguides, the underlying clad 31, the upper clad 33 and the cores 32 are formed by chemical vapor deposition (CVD), flame hydrolysis deposition or electron beam deposition.

The thin film heater 22 is formed by evaporation. Especially, in case that the waveguide substrate 11 and the arrayed waveguides 14 are formed by CVD in ordinary pressure, since deposition is performed at low temperature, a curvature of the waveguide substrate 11 is small, the thin film heater 22 can be easily evaporated thereon, and the protective layer 34 for covering the thin film heater 22 can be formed by CVD in ordinary pressure.

In case that the arrayed waveguides 14 are formed of polyimide waveguides, the waveguide layer can be formed by spin coating. Stillmore, the waveguide substrate 11 may be formed of III-V family compound semiconductor, such as InP etc.

Next, the operation of the arrayed waveguide grating 21 will be explained.

The thin film heater 22 is supplied with a current via the pads 23, 24 which are connected with the power-supply by wire-bonding. The thin film heater 22 heats the whole part of the arrayed waveguides 14 by the current supplied thereto. As shown in FIG. 3, the thin film heater 22 supplied with the current directly heats the cores 32 of the arrayed waveguides 14. According to the aforementioned structure, heat loss in the arrayed waveguide grating 21 becomes small.

If temperature of the arrayed waveguides 14 is detected and monitored always, temperature of the arrayed waveguides 14 is kept to be constant by means of a feed back circuit (not shown), and ΔL, a difference in a length between adjacent waveguides in the arrayed waveguides 14, is always kept to be constant, hence each center wavelength of the output waveguides 16 always coincides with the desired wavelength.

The temperature of the arrayed waveguides 14 is set to be higher than the maximum ambient temperature of the module, that is to say more than 65° C. for instance, and 70° C. to 80° C. in general.

According to the arrayed waveguide grating according to the aforementioned embodiment, since there is no necessity for providing the independent component for controlling temperature such as a conventional thin heater or Peltier, the module can be constructed within a height which is not significantly higher than a thickness of the circuit substrate, and the module can be thinned.

Moreover, since the thin film heater 22 is formed on the upper clad 33 of the arrayed waveguides 14 and temperature of the same is controlled by the thin film heater 22, the module does not necessitate the independent component for controlling temperature and can be unified, hence the structure of the module is resistant to external vibration or shock.

Moreover, since there is no necessity for combining the temperature-control unit with the circuit substrate together with other parts, a fabrication process of the module is simplified.

Stillmore, since temperature of the arrayed waveguides 14 is directly controlled by the thin film heater 22, control of the center wavelength of the arrayed waveguide grating 21 can be easily controlled.

Since temperature of the cores 32 of the arrayed waveguides 14 is directly controlled by the thin film heater 22, loss in heating is reduced, and it becomes possible to locally heat the cores 32 with effect. Moreover, since the thin heater 22 is confined between the upper clad 33 and the protective layer 34, temperature of the cores 32 is hard to be affected by ambient temperature. Accordingly, the arrayed waveguide grating 21 operating with small consumed electric power can be realized.

Since temperature of the arrayed waveguides 14 is directly controlled by the thin film heater 22, the characteristic of the arrayed waveguide grating 21 is hard to be affected by the external effect. Moreover, since the thin film heater 22 locally heats the arrayed waveguides 14, portions which affect reliability of the module, such as a fixed fiber array etc. can be prevented from being heated, and thereby the arrayed waveguide grating 21 with high reliability can be realized.

Moreover, since the thin film heater 22 which can be easily fabricated is used, the conventional thin heater or Peltier becomes unnecessary, and the structure that temperature of the arrayed waveguides 14 is controlled directly and easily can be provided at a low price.

In the above descriptions, although the explanations are given on the arrayed waveguide grating on the basis of the appended drawings, the concrete structure of the arrayed waveguide grating according to the invention is never restricted to the aforementioned embodiment, and several modifications and improvements can be devised so long as they do not deviate from the essence of the invention.

For example, although the thin film heater 22 is formed into a zigzag configuration in order to cover the cores 32, a configuration other than the zigzag one may be adopted.

Although the arrayed waveguide grating 21 according to the aforementioned embodiment is provided with the single input waveguide 12 and N output waveguides 16, the invention can be applied to an arrayed waveguide grating with M input waveguides 12 and N output waveguides 16 (M≠N or M=N).

As mentioned in the above, according to the arrayed waveguide grating according to the invention, since the temperature-control means is integrated with the arrayed waveguide grating for multiplexing or demultiplexing the WDM optical signals, the following effects can be obtained.

(1) Since the arrayed waveguide grating (the module, hereinafter) does not necessitates an independent component for controlling temperature, the module can be fabricated within a height which is not significantly higher than the thickness of the circuit substrate, and the module can be shaped to be thin.

(2) Since temperature of the arrayed waveguides is directly controlled by the thin film heater evaporated thereon and the module does not necessitate the independent component for controlling temperature, the module can be unified and resistant to eternal vibration and shock.

(3) Since the process for combining the temperature-control unit with the circuit substrate etc. becomes unnecessary, the fabrication process of the module is simplified.

(4) Since temperature of the arrayed waveguides is directly controlled by the thin film heater, the center wavelength of the module can be easily controlled.

(5) Since temperature of the cores of the arrayed waveguides is directly controlled by the thin film heater, it becomes possible to locally heat the cores of the arrayed waveguides. Moreover, since the thin film heater is confined between the upper clad and the protective layer, loss in heating is small, the module is hard to be affected by ambient temperature, and consumed electric power is reduced.

(6) Since the temperature of the arrayed waveguides is directly controlled by the thin film heater evaporated thereon, temperature of the arrayed waveguides is hard to be affected by ambient temperature. Moreover, since the arrayed waveguides are heated locally, portions which affects reliability of the module, such as the fixed fiber array, can be prevent from being heated, and reliability of the module can be heightened.

(7) Since the module does not necessitate an independent component for controlling temperature, such as a thin heater or Peltier, and uses the thin film heater which can be easily formed, the module can be fabricated easily at a low price.

As mentioned in the above, the thin, simplified and unified arrayed waveguide grating can be provided.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An arrayed waveguide grating for multiplexing or demultiplexing wavelength division multiplexed optical signals, comprising:

at least one input waveguide formed on a substrate;

an input slab waveguide formed on said substrate;

a plurality of arrayed waveguides formed on said substrate;

an output slab waveguide formed on said substrate;

a plurality of output waveguides formed on said substrate; and a temperature-control device integrated with said arrayed waveguides, wherein said temperature control device covers an area, in which said plurality of arrayed waveguides are formed as an upper layer.

2. The arrayed waveguide grating as defined in claim 1, wherein:

said temperature-control device is formed on said plurality of arrayed waveguides.

3. The arrayed waveguide grating as defined in claim 1, wherein:

said temperature-control device comprises a thin film heater.

4. The arrayed waveguide grating as defined in claim 3, wherein:

said thin film heater is formed by evaporation.

5. The arrayed waveguide grating as defined in claim 3, wherein:

said thin film heater comprises metal.

6. The arrayed waveguide grating as defined in claim 3, wherein:

said thin film heater is covered with a protective layer.

7. The arrayed waveguide grating as defined in claim 1, further comprising a feedback circuit.

8. The arrayed waveguide grating as defined in claim 1, wherein said feedback circuit maintains said predetermined temperature for said plurality of arrayed waveguides based on a temperature sensed at said plurality of arrayed waveguides.

9. The arrayed waveguide grating as defined in claim 3, wherein:
   at least a portion of said thin film heater includes a width greater than or equal to a corresponding width of said plurality of arrayed waveguides.

10. The arrayed waveguide grating as defined in claim 3, wherein:
    said thin film heater is formed in a zigzag direction.

11. The arrayed waveguide grating as defined in claim 3, wherein:
    said thin film heater includes a power supply pad at each of two ends of said thin film heater.

12. The arrayed waveguide grating as defined in claim 11, wherein:
    each of said power supply pads is connected to a power supply, which supplies an electric current, by wire-bonding.

13. The arrayed waveguide grating as defined in claim 1, further comprising a temperature sensor formed above a portion of said substrate.

14. The arrayed waveguide grating as defined in claim 13, wherein:
    said temperature sensor is formed above said plurality of arrayed waveguides.

15. An arrayed waveguide grating for multiplexing or demultiplexing wavelength division multiplexed optical signals, comprising:
    at lest one input waveguide formed on a substrate;
    an input slab waveguide formed on said substrate;
    a plurality of arrayed waveguides formed on said substrate;
    an output slab waveguide formed on said substrate;
    a plurality of output waveguides formed on said substrate; and
    a temperature control device integrated with said arrayed waveguides for controlling a temperature of an area, in which said plurality of arrayed waveguides are formed, to be uniform.

* * * * *